United States Patent Office 3,339,600
Patented Sept. 5, 1967

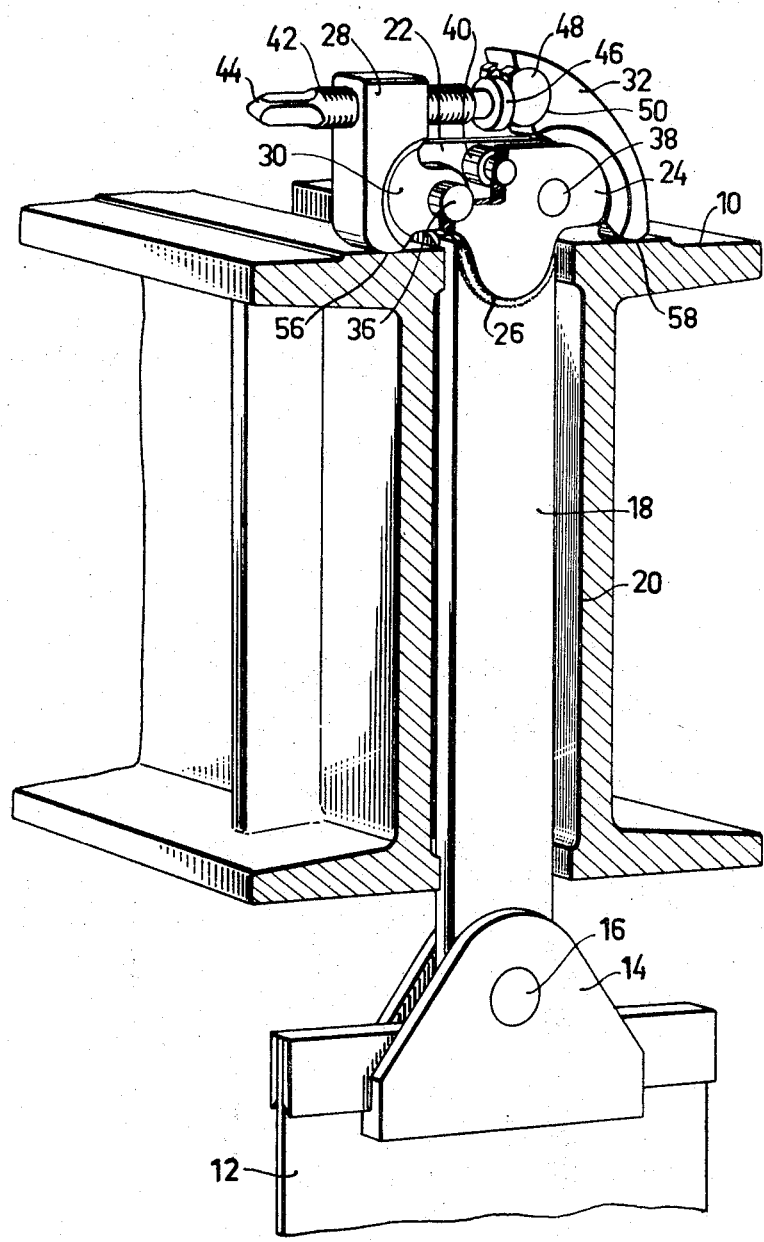

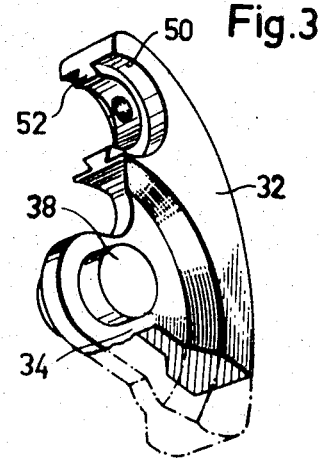
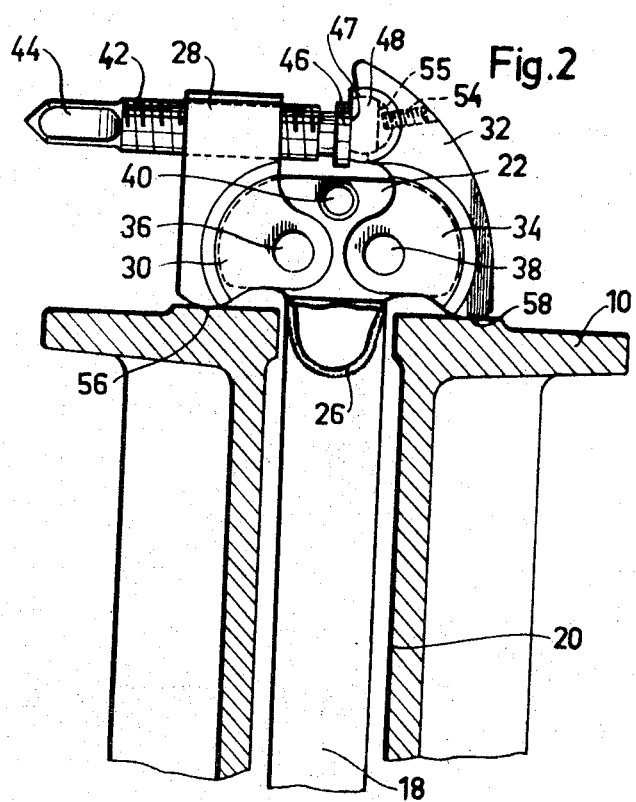

3,339,600
TAB UNITS FOR THE STRETCHING OF SAW-BLADES IN A GANG SAW
Erik Harding Tannerstål, Soderhamn, Sweden, assignor to Aktiebolaget Iggesunds Bruk, Iggesund, Sweden, a corporation of Sweden
Filed Jan. 25, 1965, Ser. No. 427,853
6 Claims. (Cl. 143—156)

ABSTRACT OF THE DISCLOSURE

The invention consists in a tab unit for setting or tensioning saw blades in the loose frame of a gang saw and includes spaced horizontal bar means, a saw blade clamping means having an upper portion passing through the space between the bar means and carrying spaced side members at such upper portion, with horizontally spaced pins supported by the side members, and a pair of arms mounted between the side members and respectively pivoted on each of the pins. An axially movable setting element is mounted in one of the arms above the associated pin and is movable to engage against the other arm to force the arms apart by turning them about the axes of the pivot pins whereby the other ends of the arms either directly or indirectly bear against the bar means to exert a lift force on the clamping element and thus tension the associated saw blade.

---

Figure 4:
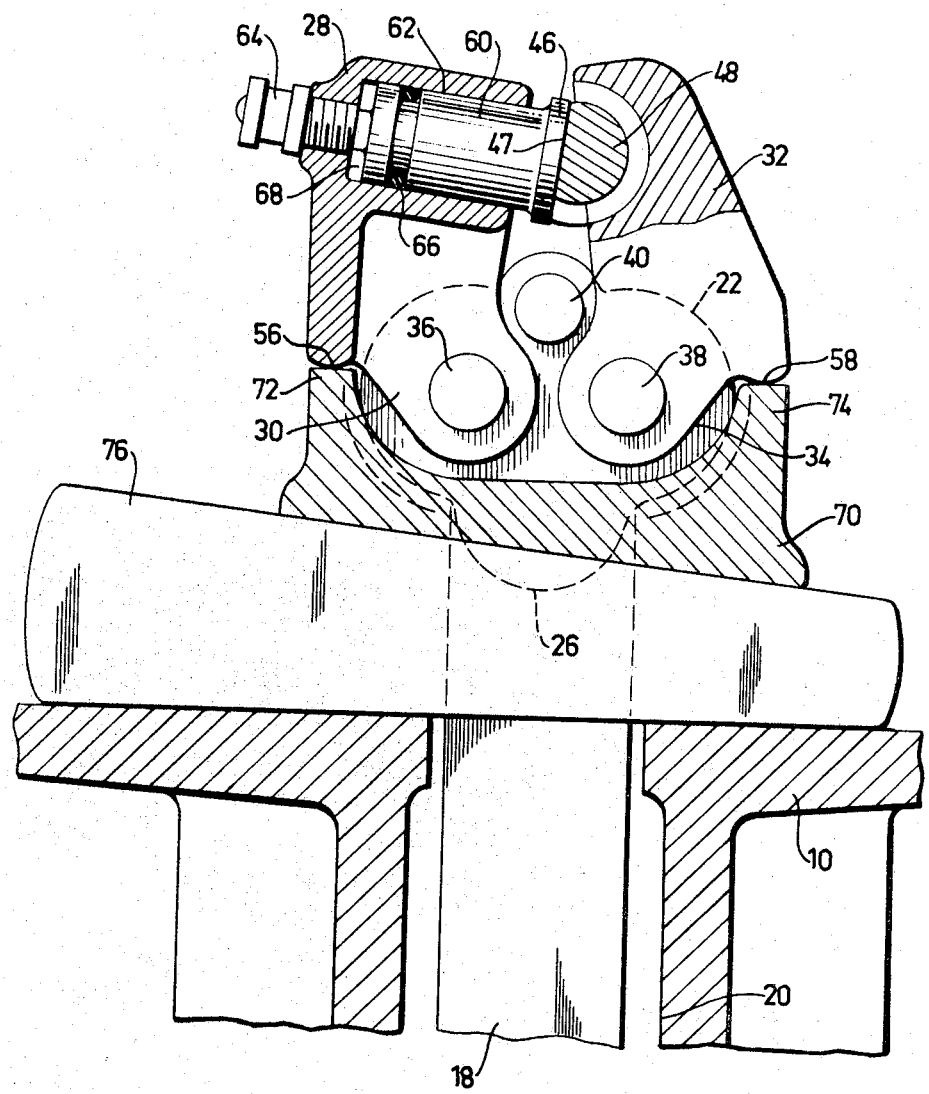

This invention relates to gang saws.

More particularly this invention relates to gang saws of the type having a loose frame which carries a plurality of saw blades.

Still more particularly this invention relates to tab units for setting the saw-blades in the saw frame or sash of the gang saw and which unit is of the type that is provided with a setting screw and and articulated system co-operating with said screw. Such so-called screw tab units have hitherto been complicated from the view point of setting for which reason they have not won any appreciable use in practice in comparison with the eccentric tab units which have been known for a long time.

One main object of the invention is to provide an improved tab unit of the set screw type which facilitates the setting work, in particular by making possible the use of tightening elements driven by elasticity or compressed air and having an initial adjusting movement so that the tension in the saw-blades can be controlled to reach an exact predetermined value.

Another object of the invention is to provide a tab unit in which the strain on the setting screw becomes low, for which reason the unit has a corresponding small lateral dimension and is one in which the external pressure acting on the articulated system is reduced and an improved distribution of the strains is obtained.

According to one main feature of the invention two arms, disposed pivotally about spaced individual pivots are thus connected to a side member which is combined with a clamping element passing through an opening formed in a horizontal bar means of the saw frame and the setting screw is threaded through a threaded hole passing from end to end substantially horizontally through one of said arms and which screw has one end bearing against the other arm so that by moving the screw in a direction towards the last-mentioned arm both arms are caused to turn about their pivots and in abutting against the horizontal bar they operate to stretch the associated saw-blade.

Further objects and advantages of the invention will become apparent from the following description, taken in connection with the accompanying drawings which form part of this specification and of which:

FIG. 1 is a perspective view illustrating one form of a tab unit embodying the invention, FIG. 2 is a side view of the embodiment shown in FIG. 1, FIG. 3 is a perspective view of one of the arms shown in FIGS. 1 and 2, and FIG. 4 is a vertical sectional view illustrating a further embodiment of the invention.

Referring to the drawings, reference numeral 10 denotes a portion of the upper horizontal frame bar composed of two parallel pieces, of a loose frame pertaining to a gang saw. Between said upper frame bar and a lower frame bar, not shown, a plurality of saw-blades are stretched by means of tab units. FIG. 1 illustrates a saw-blade 12 of this type, the upper end portion of which is introduced into a clamping block 14 secured in an articulated manner by tap or pin 16 relatively to a clamping element 18. The clamping element 18 extends through an opening 20 formed between the pieces of the frame bar 10.

In accordance with the invention, two side members 22, 24 of identical shape are fixed relative to one another and to the clamping element such as by means of welded seams 26 (the side member positioned nearest the viewer being assumed to be partly cut off in FIG. 1 and entirely cut away in FIG. 2). The two side members are spaced from one another for a distance which approximately corresponds to the thickness of the clamping element 18 and they have a breadth exceeding that of said element so as to project out of the opening 20 on both sides thereof. An arm 28 has a portion 30 of reduced thickness projecting between the two side members 22, 24. In the same manner another arm 32 has a portion 34 of reduced thickness which projects into the same space from the opposite side of said side members. The portions 30 and 34 are provided with pivots 36 and 38, respectively, extending from both sides thereof and fitting into corresponding apertures formed in the respective side members 22 and 24. The arms 28 and 32 are thus pivotable about pivots 36, 38 relatively to the side members. Upon mounting of the side members on either sides of the arms 28, 32 said parts are joined together by means of a rivet 40 which also may serve as a spaced between the side members. The side members are then welded to the upper part of the clamping element 18.

A set screw 42 is screwed into a horizontal or substantially horizontal threaded hole provided in the arm 28. The set screw has one end portion 44 of polygonal contour so that the screw may be turned by means of a suitable tool. The other end portion 46 of the set screw is flat and bears against the planar face 47 of a thrust washer 48 provided in a recess in the arm 32. The arm 32 has a guide surface 50 extending over more than a half-circle and formed with a central cam 52 of dovetailed shape. The thrust washer 48 has a corresponding shape so that it may be turned into the guide surface 50 whereupon it is retained in this latter by means of a set screw 54 projecting into a recess formed by a planed portion 55 in the support. In this manner the thust washer 48 is restrictedly rotatable about an axis parallel with the axes of pivot pins 36, 38.

The device described hereinbefore becvomes operative in the following manner.

After a fresh saw-blade 12 has been suspended in the clamping block 14, the adjusting or setting screw 42 is tightened. This causes the two arms 28, 32 to turn or rotate about the axes of their pertaining pivot pins 36, 38, respectively. The end 46 of the set screw presses against the face 47 of thrust washer 48 carried by the arm 32 so as to cause the upper portions of said arms to move apart to increase their spacing from one another. At the same time the lower, preferably rounded faces 56, 58 of arms 32, 34 press against the upper side of the horizontal portion of frame bar 10. The result is that the arms simultaneously with their rotating movements urge the pivot pins 36, 38 and the side members 22, 24 and bar 18 to move in an upward direction whereby the saw-blade is stretched. The forces produced thereby are distributed symmetrically along a medium plane through the clamping element and at the same time the tightening of the set screw 42 can be performed in a handy manner, if desired by means of tightening means having a torque of predetermined magnitude. The thrust washer 48 is pivotably mounted in the arm 32 so that its surface 47 bearing against the end of set screw 42 always remains in parallel relation to the end portion 46 of such screw.

The embodiment shown in FIG. 4 differs from the preceding one mainly by the feature that the set or adjusting screw 42 is replaced by a piston 60 located within a cylinder 62 formed in the arm 28 and adapted to be actuated by a pressure fluid supplied through a conduit 64. The piston 60 engages with its end portion 46 the thrust washer 48 rotatably mounted in the arm 32. A sealing ring 66 is disposed in an annular recess 68 formed on the piston 60.

In this embodiment the arms 28, 32 do not directly bear against the frame bar 10, but a block means 70 is positioned between said elements, said block means having upwardly projecting parts 72, 74, against which the rounded surfaces 56, 58 of the arms bear. These surfaces will thus be approximately on the same level as the centers of the pivot pins 36, 38 which results in that the surfaces are subjected to a minimum of sliding friction on the projecting portions 72, 74 when the arms 28, 32 are rotated about the axes of pivots 36, 38. Further, there is provided between the block 70 and the frame bar 10 a wedge member 76 by which the first adjustment of the position of the arms 28, 32 relative to the block means 70 can be effected before the final setting and stretching of the saw-blade is performed by means of the hydraulically actuated piston 60.

While several embodiments of the invention have been shown and described, it is to be understood that this is for purpose of illustration only, and that the invention is not to be limited thereby, but its scope is to be determined by the appended claims.

What I claim is:
1. A tab unit for setting or tensioning saw blades in the loose frame of a gang saw of the type including spaced horizontal bar means, said unit comprising a blade clamping means having an upper portion passing through the space between said bar means, laterally spaced side members rigidly secured to the upper portion of said clamping means, horizontally spaced pins carried by said side members, two arms disposed between said side members and each pivotally mounted on one of said pins, each arm having an abutment adapted to apply a pressing force in a direction toward said bar means, one of said arms having a recess therein extending transversely of and above the pin associated with said one arm, and an axially movable setting member movably supported in said recess and having an end portion engaging the other arm so that when said setting member is moved in a direction toward said other arm the two arms are caused to rotate in the opposite direction about the axes of said pivot pins so as to stretch a saw blade associated with the blade clamping means.

2. The tab unit as claimed in claim 1 in which each arm has a portion of reduced thickness projecting into the space between said side members.

3. The tab unit as claimed in claim 1 in which said other arm carries a thrust washer for cooperation with said setting member and means mounting such thrust washer for restricted turning movement about an axis parallel to the axes of the pins.

4. The tab unit as claimed in claim 1 in which the recess in one said arm is a threaded aperture therethrough and the setting member is a screw in threaded engagement within such aperture.

5. The tab unit as claimed in claim 1 in which the recess in said one arm constitutes a cylinder and the axially movable setting member is a hydraulically actuated piston movable within such cylinder.

6. The tab unit as claimed in claim 5 further including a block means disposed between the horizontal bar means and the arms, said block means having upper supporting surfaces for cooperation with the abutments on the arms and said supporting surfaces being located approximately at the level of the pins.

References Cited
UNITED STATES PATENTS 2,113,909  4/1938  Wasserkampf _____ 143—156

FOREIGN PATENTS 213,040  1/1961  Austria.
198,784  5/1908  Germany.
912,011  5/1954  Germany.

DONALD R. SCHRAN, *Primary Examiner.*